United States Patent [19]

Machin

[11] Patent Number: 4,730,401
[45] Date of Patent: Mar. 15, 1988

[54] DRIER FOR A VEHICLE WASH AND METHOD OF CONTROLLING SAME

[76] Inventor: Roy Machin, Im Kalblesbiegel 16, D-741 Reutlingen, Fed. Rep. of Germany

[21] Appl. No.: 931,735

[22] Filed: Nov. 17, 1986

[30] Foreign Application Priority Data

Nov. 16, 1985 [DE] Fed. Rep. of Germany ....... 3540767

[51] Int. Cl.$^4$ .............................................. F26B 21/06
[52] U.S. Cl. .......................................... 34/43; 34/229; 34/243 C
[58] Field of Search ................... 134/123; 15/DIG. 2; 34/243 C, 43, 229, 225, 243 R

[56] References Cited

U.S. PATENT DOCUMENTS 4,562,848  1/1986  Messing et al. ............... 15/DIG. 2

FOREIGN PATENT DOCUMENTS 3208527  10/1982  Fed. Rep. of Germany .

Primary Examiner—Larry I. Schwartz
Attorney, Agent, or Firm—Karl F. Ross; Herbert Dubno

[57] ABSTRACT

The process according to the invention controls a drying device for a vehicle wash for a vehicle, a travelling portion of the drying device being movable relative to the vehicle with the aid of a travel motor and a lift motor. The travelling portion carries a drying means and a light barrier whose light beam passes with clearance under the drying means and a device controller operating the travel and lift motors guided on a path which keeps a guaranteed clearance from the contour of the vehicle. At the beginning of the drying process the portion of the drying device in a lowered initial position in front of or behind the vehicle is moved. As a result at least the raising and lowering of that portion is controlled by a gating signal. Before beginning each drying process the sensitivity or response threshold of a gating device for the gating signal and/or a conditioning device adjusting the gating signal is adjusted automatically to a value sufficient to define the release of the light beam. A drying device which performs the process according to the invention is also described.

4 Claims, 4 Drawing Figures

4,730,401

DRIER FOR A VEHICLE WASH AND METHOD OF CONTROLLING SAME

FIELD OF THE INVENTION

My present invention relates to a process for controlling drying device for a vehicle washing unit, and to a vehicle washing unit controlled by this process.

BACKGROUND OF THE INVENTION

A known drying device for a car wash can have a light gate controlling the spacing between the vehicle body and the nozzles discharging the drying air. This gate can have a varying response which can be altered by sprayed water or a dirt condition increasing the light attenuation between the light source and light detector. The light gate is also influenced by reflected or ambient light or by temperature or other changes of component characteristics.

When an incomplete light beam interruption occurs on entrance of the vehicle into the light beam, particularly on entrance of the curved vehicle front or rear panel into the beam, frequently only an insignificant beam attenuation is noted so that the gating signal for "beam breaking" and/or "beam release" fails to occur or is too late so that the portion of the drying device controlled by the gating signal is not kept a sufficiently safe distance from the contour of the vehicle. In such units the response sensitivity of the gating must be adjusted manually by changing the response threshold of the threshold circuit or by changing the amplification of the limiting signal or by changing the light intensity of the light source.

In practice during operation, manual adjustment of the response sensitivity has a big disadvantage, namely that frequently an incorrect sensitivity is used since the adjustment must be made by a novice or technically unskilled person. Severe damage can also occur when the gating does not respond properly to the entrance and exit of the components of the vehicle into the light beam.

A vehicle wash unit is known according to German Open Patent Application No. 32 08 527 in which a vehicle moves past several work stations, the contour of the vehicle already being determined and stored before the vehicle reaches the first work station by a sensing device comprising a plurality of light gates positioned one above another. The supplied contour data is then used by the individual work stations for positioning of their working means as the vehicle passes through. This is a complex arrangement not amenable to use with frame-type car washers which are moved along the vehicle.

OBJECTS OF THE INVENTION

It is an object of my invention to provide an improved drying device for a vehicle wash, particularly a car wash, and an improved associated process for controlling it which obviate the drawbacks enumerated above and discussed, as well, below.

It is also an object of my invention to provide an improved drying device for a vehicle wash in which the response sensitivity of the vehicle wash always has a value guaranteeing the safe operation of the unit.

SUMMARY OF THE INVENTION

These objects and others which will become apparent hereinafter are attained in a process for control of a drying device for a vehicle wash for a vehicle with a travelling portion of the drying device movable relative to the vehicle with the aid of a travel motor and a lift motor in a direction of a longitudinal and a lift or vertical axis of the vehicle, the travelling portion carrying a drying means, a light barrier or light curtain whose light beam passes with clearance under the drying means and a device controller operating the travel and the lift motors so that said travelling portion is guided on a path which maintains a guaranteed clearance from the contour of the vehicle, in which at the beginning of the drying process the portion in a lowered initial position in front of or behind the vehicle is moved and in which as a result at least the raising and lowering of that portion is controlled by a gating signal.

According to my invention before beginning each drying operation the sensitivity or response threshold of a gating device for the gating signal and/or a conditioning device adjusting the gating signal is adjusted automatically to a value sufficient to ensure the complete passage of the light beam (and its detection at the light receiver being such that the latter can respond to beam interruption).

In one embodiment of the process according to my invention before motion of the travelling portion of the drying device the sensitivity or the response threshold with the light beam present is changed so that the gating signal is varied from a signal corresponding to continuity of the beam to a signal corresponding to interruption of the light beam and then the sensitivity or the response threshold is adjusted to a small defined value in the opposite sense, i.e. from the interruption slightly toward the beam continuity level of the sensitivity.

Advantageously the automatic adjustment of the sensitivity or the response threshold takes place additionally during running of the drying operation.

A drying device for a vehicle wash according to my invention comprises a travelling portion of the drying device movable relative to the vehicle with the aid of a travel motor and a lift motor in a direction of a longitudinal axis and a lift or vertical axis of the vehicle. The travelling portion carries a drying means and a light barrier whose light beam passes with clearance under the drying means. A device controller operates the travel and the lift motors guiding the travelling portion on a path which keeps a guaranteed clearance from the contour of the vehicle. The light barrier including a light source, a light detector and a signal conditioner which transmits a gating signal to the device controller. The gating signal indicates a light barrier breaking and a light barrier continuity and acts on an amplifier to produce an output signal of the detected light beam. The amplifier contains a threshold circuit acted upon with the output signal and an adjustable voltage generator which transmits a control voltage for adjustment of the amplification factor of the amplifier or the threshold circuit or the supply voltage for the light source.

Advantageously an automatic adjustment is provided for the voltage generator which is activated by the control device at the start of each of the drying processes and which changes the voltage produced by the voltage generator so that with the gating signal present the gating output signal reports the light beam breaking and then the voltage produced by the voltage generator is shifted by a small definite value in the opposing sense.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
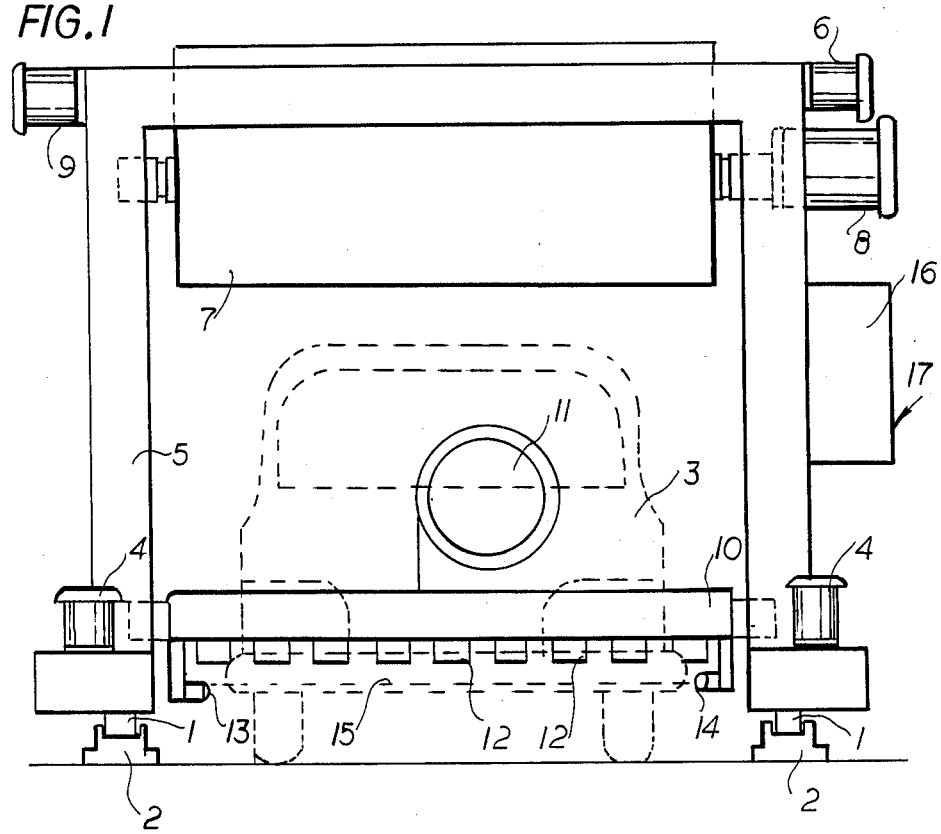
FIG. 1 is a schematic front elevational view of a known car wash with a drying device according to my invention.

In FIG. 1 a device frame 5 movable with the help of a travel motor 4 on wheels 1 rolling on rails 2 in the direction of a longitudinal axis of a vehicle to be washed and dried carries a horizontal wash brush 7 raisable and lowerable by a lift motor 6 which is driven by a wash brush motor 8. In its device frame 5 a device member 10 is mounted on the opposite side raisable and lowerable by a second lift motor 9 which carries a drying blower with a blower motor 11, a plurality of drying air nozzles 12 feeding drying air and a light barrier having a light source 13 and a light detector 14 whose light beam 15 passes under the drying air nozzles.

The travelling portion of the drying device comprises the device frame 5 and the attached components.

In the beginning of the drying process the travelling device member 10 of the drying device takes an initial position in front of or behind the vehicle 3 and moves from it in the vehicle longitudinal direction until the vehicle enters the light beam 15 of the light barrier.

Figure 2:
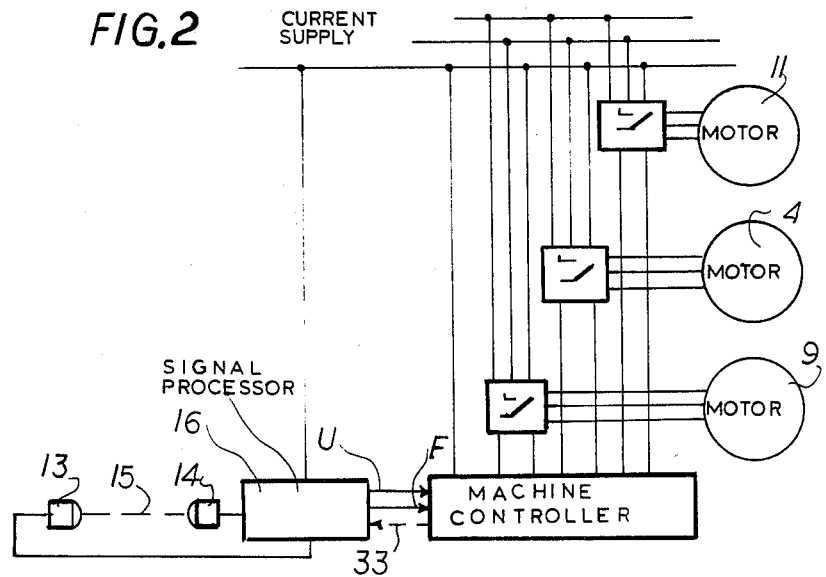
FIG. 2 is a simplified block diagram of an electrical control circuit for the apparatus according to FIG. 1.
Figure 3:
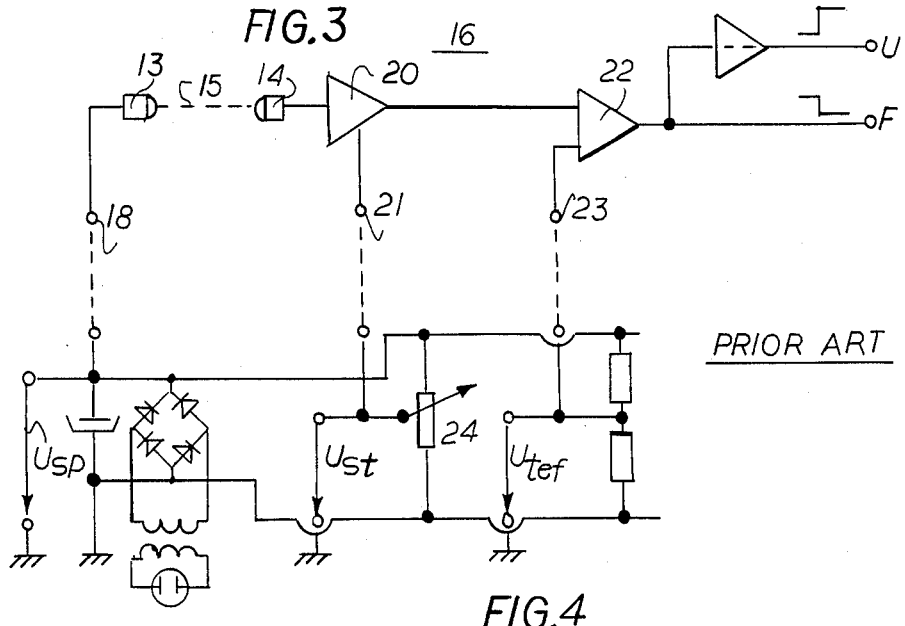
FIG. 3 is a circuit diagram of a prior art signal processing circuit for the portion of the electrical control circuit of FIG. 2 providing the gating signal.

A signal processing device 16 shown in detail in FIG. 3 reports the interruption of the light beam 15 to the device control 17 controlling among other things the second lift motor 9 and the travel motor 4 shown in detail in FIG. 2. It activates the rising of the device member 10 until the light beam 15 is again detected. During the raising process the longitudinal motion can be interrupted or slowed down and the process can be repeated along a first portion of a path. On a second portion of travel in the longitudinal motion the device member 10 lowers on sensing a signal reporting the detection of the light beam 15, whereby the longitudinal motion again can be slowed down or halted.

In the signal conditioning device (16 in FIG. 3) a voltage $U_{sp}$ provided by a voltage source 19 is connected to a supply terminal 18 of the light source 13.

The gate signal delivered by the light sensor 14 is amplified in an amplifier 20, whose amplification factor is determined by a control voltage $U_{st}$ connected to a control terminal 21 and compared with a reference voltage $U_{ref}$ connected to an additional initial terminal 23 in a threshold circuit which is formed by an operational amplifier operating as a voltage comparator.

An output signal F of the threshold circuit and if necessary an inverted signal U reach and/or reach as a control signal the control device (17 in FIG. 2). These signals identify the breaking of the light beam and/or the detection of the light beam after such breaking.

These signals cause a raising and lowering of the member 10 during or alternating with its longitudinal motion in such a way that the drying air nozzles 12 keep a safe distance from the contour of the vehicle 3.

Figure 4:
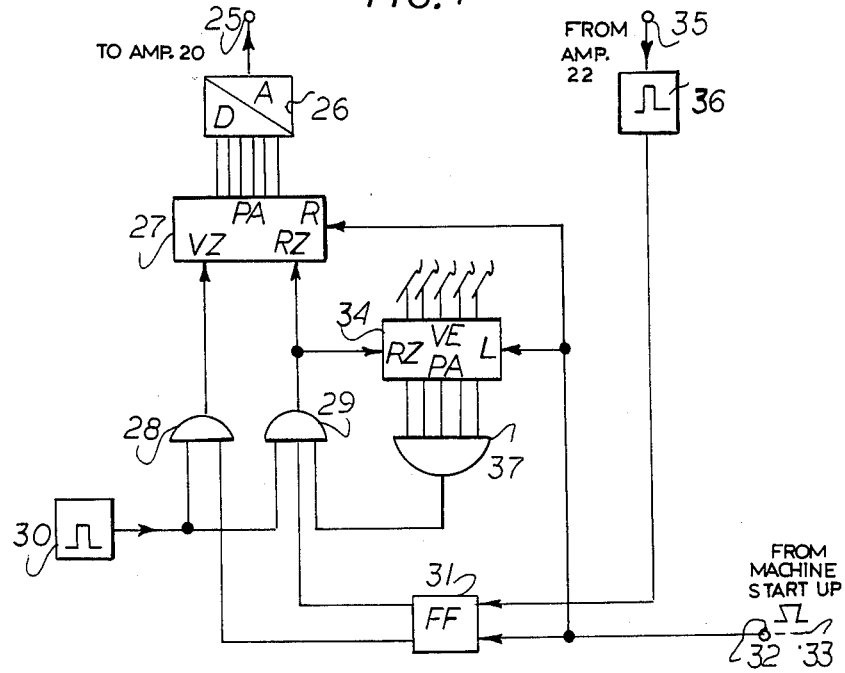
FIG. 4 is a circuit diagram showing the gate control circuit for the drying device according to my invention.

My invention is illustrated in FIG. 4. The signal conditioning device 16 of the drying device contains a voltage generator adjustable automatically to a voltage guaranteeing reliable operation of the gating. Its output terminal 25 from the outlet section of an analog/digital converter 26 is connected with a signal conditioning device 16 at the terminals 18 or 21 or 23.

If one refers to FIG. 3, the device of FIG. 4 replaces the related voltage source connected with it, e.g. the potentiometer 24 at the terminal 21. A forward/backward counter 27 controls with its parallel outputs PA the digital/analog converter 26 and can receive at its forward counting input VZ and at its reverse counting input RZ step pulses from a timing generator by an And-gate 28 and/or 29 acting as a switching circuit.

The second input port of the And-gate 28 and 29 is connected to both output ports of a flipflop 31, whose input port is connected to a starting terminal 32 to which the device controller 17 transmits a pulse as the command for the start of the adjusting process over a connecting conductor 33 shown in FIG. 2 in dotted. With this starting pulse also the counter 27 is reset and a back counter 34 loaded with the information set at its input port.

The pulses reaching the open And-gate device 28 at the counting input port VZ are counted by the counter 27 whereby a climbing voltage ramp is produced at the outlet of the analog/digital converter, with which the amplification factor of the amplifier 20 in FIG. 3 is raised until the output signal of the light sensor 14 is amplified strongly enough so that it reaches the reference voltage at the terminal 23 whereby a voltage step develops at the outlet of the operational amplifier 22. This reaches a pulse shaper 36 through the probe terminal 35 whose output is a pulse which acts as a command for stopping the comparison process for resetting of the flipflop 31.

The flipflop 31 trips, closes the And-gate 28 and opens the And-gate 29 so that the step pulse reaches both resetting counter input ports RZ of the counters 27 and 34, whereby at the output of the digital/analog converter 26 the ramp voltage falls off until the back counter has been reset to zero. This sets a Nor-gate device 37 connected with its parallel port PA whose output voltage changes and the And-gate 29 shuts ending the comparison process.

By the comparison process the output voltage applied to the terminal 25 goes from zero to a value at which the output signal of the operational amplifier 22 jumps and a change occurs between the signal breaking the beam of light and subsequently in the opposing direction to set a small value sensitivity, which is fixed by the information in the input control port VE of the rear counter between the interruption level and the beam-continuity level, but close to that of the interruption level.

I claim:

1. In a process for control of a drying device for a vehicle wash for a vehicle with a travelling portion of said drying device movable relative to said vehicle with the aid of a travel and a lift motor in a direction of a longitudinal and a lift axis of said vehicle, said travelling portion carrying a drying means and a light barrier whose light beam passes with clearance under said drying means and with a device controller operating said travel and said lift motors guiding said travelling portion on a path which keeps a guaranteed clearance from the contour of said vehicle comprising at the beginning of the drying process moving said travelling portion into a lowered initial position in front of or behind said vehicle and controlling at least the raising and lowering of said portion by a gating signal, the improvement wherein before beginning said drying process the sensitivity or response threshold of a gating device for said gating signal and/or a conditioning device adjusting said gating signal is adjusted automatically to a value sufficient to define a passage of the light beam capable of signalling its interruption so that before motion of said portion of said drying device, said sensitivity or said response threshold with said light beam present is changed so that said gating signal is varied from a signal indicating light beam continuity to a signal indicating the interruption of said light beam and then said sensitivity or said response threshold is adjusted to a small definite value in the opposing sense.

2. A process according to claim 1 wherein the automatic adjustment of said sensitivity or said response threshold takes place during running of the drying operation.

3. In a drying device for a vehicle wash with a travelling portion of said drying device movable relative to said vehicle with the aid of a travel motor and a lift motor in a direction of a longitudinal axis and a lifting or vertical axis of said vehicle, said travelling portion carrying a drying means and a light barrier whose light beam passes with clearance under said drying means and with a device controller operating said travel and said lift motors guiding said travelling portion on a path which keeps a guaranteed clearance from the contour of said vehicle, as a result at least the raising and lowering of said portion is controlled by a gating signal, said light barrier including a light source, a light detector and a signal conditioner which transmits said gating signal to said device controller which indicates a light barrier breaking and a light barrier release and which acts on an amplifier to produce an output signal of the detected light beam which contains a threshold circuit acted upon with said output signal of said amplifier and an adjustable voltage generator which transmits a control voltage for adjustment of the amplification factor of said amplifier or said threshold circuit or said light source, the improvement wherein an automatic adjustment is provided for said voltage generator which is activated by said control device at the start of said drying process and which changes said voltage produced by said voltage generator so that with said gating signal present said gating signal reports said light beam breaking and then said voltage produced by said voltage generator varies about a small definite value.

4. In a method of operating a vehicle washer in which a washer frame is moved along a vehicle to effect washing thereof by brushes carried by said frame and drying of the vehicle is effected by movement of said frame along said vehicle and controlled displacement of drying nozzles in response to a light beam which can be interrupted by the vehicle to maintain a substantially constant spacing of the nozzles from the vehicle the improvement which comprises the steps of:

before commencement of a drying operation, selecting a value representing a desired response to interruption of said light beam;

generating a start pulse at commencement of said drying operation;

in response to said start pulse, transferring said value to a countdown counter and resetting an up/down counter;

gating to an up-counting input of said up/down counter a sequence of pulses to accumulate a count in said up/down counter whose increase in magnitude corresponds to increasing response to said light beam;

detecting the response to said light beam and generating a feedback pulse upon said response exceeding a predetermined threshold value, with said feedback pulse blocking the gating of pulses from said clock to said up-counting input and gating pulses from said clock to a down-counting input of said up/down counter and to said countdown counter until said value is reached therein; and effecting said drying operation with the response to said light beam being determined automatically by the count in said up/down counter when said value has been reached in said countdown counter.

* * * * *